United States Patent
Moczala et al.

(10) Patent No.: US 10,308,279 B2
(45) Date of Patent: Jun. 4, 2019

(54) FLUID CONTAINER IN PARTICULAR HYDRAULIC TANK FOR A MOTOR PUMP UNIT

(71) Applicant: TRW Automotive GmbH, Alfdorf (DE)

(72) Inventors: Michael Moczala, Mettmann (DE); Gilbert Hesmer, Bochum (DE)

(73) Assignee: TRW Automotive GmbH, Alfdorf (DE)

( * ) Notice: Subject to any disclaimer, the term of this patent is extended or adjusted under 35 U.S.C. 154(b) by 79 days.

(21) Appl. No.: 14/427,030

(22) PCT Filed: Sep. 10, 2013

(86) PCT No.: PCT/EP2013/068694
§ 371 (c)(1),
(2) Date: Mar. 10, 2015

(87) PCT Pub. No.: WO2014/037577
PCT Pub. Date: Mar. 13, 2014

(65) Prior Publication Data
US 2015/0239497 A1    Aug. 27, 2015

(30) Foreign Application Priority Data
Sep. 10, 2012    (DE) .......................... 10 2012 017 836

(51) Int. Cl.
*B62D 5/07*    (2006.01)
*B62D 5/06*    (2006.01)
(Continued)

(52) U.S. Cl.
CPC ............... *B62D 5/07* (2013.01); *B62D 5/062* (2013.01); *B62D 5/064* (2013.01); *F15B 1/26* (2013.01);
(Continued)

(58) Field of Classification Search
CPC .......... B60T 17/06; F15B 1/26; F15B 21/047; B62D 5/062; B62D 5/07
(Continued)

(56) References Cited

U.S. PATENT DOCUMENTS 2,456,651 A * 12/1948 Schmiel .................... B66F 3/42
137/271
2,959,008 A * 11/1960 Caroli ................ B01D 19/0057
210/223

(Continued)

FOREIGN PATENT DOCUMENTS

DE    10215068 A1    10/2003
DE    10242050 A1    3/2004
(Continued)

OTHER PUBLICATIONS

German Search Report, Application No. 10 2012 017 836.0, dated Oct. 25, 2012.

(Continued)

*Primary Examiner* — Angelisa L. Hicks
(74) *Attorney, Agent, or Firm* — MacMillan, Sobanski & Todd, LLC

(57) ABSTRACT

A fluid container, in particular a hydraulic tank for a motor pump unit, has an equalizing chamber that is adapted to contain a supply of fluid and air, and at least one return chamber into which a return flow of the fluid can flow, a fluid communication being provided between the return chamber and the equalizing chamber. The return chamber is provided with a suction port for a pump, in particular of the motor pump unit.

20 Claims, 4 Drawing Sheets

(51) Int. Cl.
  *F15B 1/26* (2006.01)
  *F15B 21/047* (2019.01)

(52) U.S. Cl.
  CPC ..... *F15B 21/047* (2013.01); *Y10T 137/85978* (2015.04)

(58) Field of Classification Search
  USPC .................................................. 137/547, 574
  See application file for complete search history.

(56) References Cited

U.S. PATENT DOCUMENTS

| | | | |
|---|---|---|---|
| 4,210,176 A * | 7/1980 | Emming | F15B 1/26 137/573 |
| 4,385,495 A | 5/1983 | Kubota | |
| 4,424,829 A | 1/1984 | Millington et al. | |
| 5,001,901 A * | 3/1991 | Erickson | F16N 7/40 60/336 |
| 5,477,882 A | 12/1995 | Duthie | |
| 6,220,283 B1 * | 4/2001 | Saarinen | B62D 5/062 137/550 |
| 8,491,707 B2 * | 7/2013 | Knuth | F15B 1/26 137/1 |
| 2004/0187931 A1 | 9/2004 | Crossman et al. | |
| 2005/0092375 A1 | 5/2005 | Kim | |
| 2007/0028968 A1 | 2/2007 | Sanderson et al. | |
| 2008/0121289 A1 | 5/2008 | Kobayashi et al. | |

FOREIGN PATENT DOCUMENTS

| | | | |
|---|---|---|---|
| DE | 102004015960 A1 * | 9/2005 | ............ B62D 5/062 |
| DE | 102004038265 B3 | 3/2006 | |

OTHER PUBLICATIONS

PCT International Search Report, Application No. PCT/EP2013/068694, dated Oct. 31, 2013.

* cited by examiner

FLUID CONTAINER IN PARTICULAR HYDRAULIC TANK FOR A MOTOR PUMP UNIT

CROSS-REFERENCE TO RELATED APPLICATIONS

This application is the National Phase of International Application PCT/EP2013/068694 filed Sep. 10, 2013, which designated the U.S. That International Application was published in English under PCT Article 21(2) on Mar. 13, 2014 as International Publication Number WO 2014/037577A1. PCT/EP2013/068694 claims priority to German Application No. 10 2012 017 836.0 filed Sep. 10, 2012. Thus, the subject nonprovisional application also claims priority to German Application No. 10 2012 017 836.0 filed Sep. 10, 2012. The disclosures of both of these applications are incorporated herein by reference.

BACKGROUND OF THE INVENTION

The present invention relates to a fluid container, in particular a hydraulic tank for a motor pump unit.

In electrohydraulic vehicle steering systems, motor pump units are made use of which supply a hydraulic circuit with hydraulic fluid from a hydraulic tank. Restrictions in installation space and measures to reduce costs necessitate that the additional equalizing tanks for the hydraulic fluid which are commonly used and are located at an elevated point are dispensed with and that, instead, one-piece and at the same time small tanks are used. The high performance or output of the motor pump unit required in modern systems leads to an increase in volume flows of the hydraulic fluid which flows into the tank at a high velocity, the tank also including an equalizing volume filled with air. This may possibly entail a violent mixing of air and hydraulic fluid, which results in a foam formation. The air bound in the foam is then sucked in through the pump of the motor pump unit, and the efficiency of the system will decrease drastically.

In order to counteract these problems, DE 10 2004 015 960 A1 already describes a hydraulic tank in which a return flow from the hydraulic circuit and a hydraulic flow delivered through a pressure control valve of the pump are first deflected by flow guiding elements arranged in the tank before they reach an accommodation chamber for the hydraulic fluid. This is intended to stabilize the inflowing hydraulic fluid and to avoid foaming up.

In contrast, the invention provides a fluid container which is based on an entirely novel operating principle, as a result of which a foam formation can be completely avoided even in the case of very high performance densities.

SUMMARY OF THE INVENTION

According to the invention, for this purpose a fluid container, in particular a hydraulic tank for a motor pump unit, includes an equalizing chamber that is adapted to contain a supply of fluid, in particular hydraulic fluid, and air, and at least one return chamber into which a return flow of the fluid can flow, a fluid communication being provided between the return chamber and the equalizing chamber, and the return chamber being provided with a suction port for a pump, in particular of the motor pump unit.

In this configuration, the suction port for the pump is thus arranged directly within the return chamber, so that the fluid return flow is directly supplied to the suction port for the pump, that is, without any appreciable mixing with the fluid present in the equalizing chamber or the air volume contained therein. As a result, in the fluid container according to the invention, the regions of high fluid velocities are delimited from the region of low fluid velocity, namely the equalizing chamber, whereas in the prior art provision is made to first decelerate a return flow of the fluid before introducing it into the equalizing chamber, and then to supply it to the pump again via a suction port applied in the equalizing chamber. In this way, the invention provides a small, one-piece and cost-effective fluid container which distinguishes itself by a particularly advantageous flow routing and in which a foam formation can be completely avoided based on the clear separation of the high kinetic energy and low kinetic energy fluid regions even in the case of very high performance densities.

Advantageously, the chambers are delimited from one another by chamber walls which have at least one flow restrictor provided therein which is arranged between the chambers. In this way, in the interior of the return chamber, only fluid that returns and is not mixed with air is sucked up by the pump, and if a volume equalization takes place from the equalizing chamber into the suction portion of the return chamber, only stabilized, low-air fluid flows into the return chamber via the flow restrictor.

The flow restrictor may be realized here by a narrow gap, an opening, a filter segment or a similar element having a throttling effect.

In particular, the chambers are delimited from one another by chamber walls which project deeply into the fluid. In this way, the flow restrictors are formed by narrow gaps below these chamber walls, which consequently are located deeply below the fluid surface. In this configuration it is unlikely that a flow jet that possibly exits from the flow restrictor breaks through the fluid surface and causes an undesirable mixing of fluid and air.

In a preferred embodiment, the return chamber is subdivided into a return flow chamber into which a return port of a hydraulic circuit opens that is supplied by the pump, and a valve flow chamber into which an overpressure port of a pressure relief valve of the pump opens. Here, the return flow chamber and the valve flow chamber are more particularly spatially separated from each other, and both the return flow chamber and the valve flow chamber each have at least one suction port arranged therein through which the respective hydraulic flow is directly supplied to the pump. This means that the fluid container according to the invention, which is made use of in particular in the form of a hydraulic tank for a motor pump unit, has a cascaded structure with a plurality of purposefully incorporated chambers which clearly separate the high fluid velocity areas and the low fluid velocity areas from each other and in this way prevent air and fluid from being mixed.

To be able to allow any air that may be present to escape from the hydraulic circuit into the equalizing chamber, the return flow chamber and/or the valve flow chamber may have a venting means. In particular, both chambers have venting means.

In a preferred configuration, the return flow chamber includes a flow guiding element which directs a partial flow from the return flow chamber into the equalizing chamber. An automatic, permanent venting of the return flow chamber is achieved thereby.

Since air bubbles may also be introduced into the valve flow chamber at intervals, the valve flow chamber advantageously includes a vent opening which is applied in a chamber wall that separates the valve flow chamber from the equalizing chamber. This allows the valve flow chamber to be vented without the flow routing being impaired.

In this connection, the vent opening may be arranged at an elevated point, in particular a highest point of the chamber wall.

As an alternative, the vent opening extends over a partial height or even the entire height of the chamber wall.

In order to obtain an optimum flow of the fluid towards the suction port, the return chamber preferably includes at least one flow guiding element which directs the return flow towards the suction port for the pump. In this way, at the most a small partial flow moves from the return chamber into the equalizing chamber; such partial flow does not stimulate the fluid that is present there to mix with the air equalizing volume. The flow guiding element is more particularly arranged in the return flow chamber here. Preferably, the flow guiding element comprises a plurality of shaped elements, so that there is an optimum flow towards a plurality of suction ports.

BRIEF DESCRIPTION OF THE DRAWINGS

Further features and advantages of the invention will be apparent from the following description of several preferred embodiments with reference to the accompanying drawings, in which.

DETAILED DESCRIPTION OF THE PREFERRED EMBODIMENTS

Figure 1:
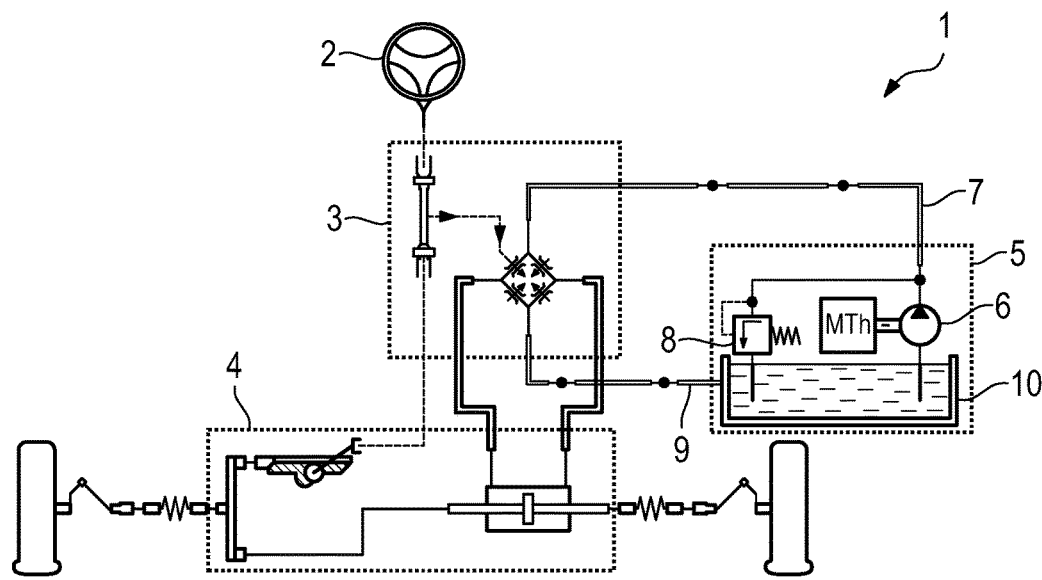
FIG. 1 shows a schematic representation of an electrohydraulic vehicle steering system with a fluid container according to the invention, in the form of a hydraulic tank.

FIG. 1 shows an electrohydraulic vehicle steering system 1 having a steering wheel 2 which is coupled to a steering gear 4 via a servo valve 3 in a known manner. Further provided is a motor pump unit 5 which constitutes the interface between the electric part and the hydraulic part of the electrohydraulic vehicle steering system 1 and comprises a pump 6 which supplies the hydraulic circuit 7 in a known manner with hydraulic fluid from a fluid container in the form of a hydraulic tank 10. The pump 6 includes a pressure relief valve 8 through which a fluid flow flows directly back from the pressure side of the pump 6 into the hydraulic tank 10. In addition, the hydraulic fluid that is returned from the hydraulic circuit is supplied to the hydraulic tank 10 as a return flow 9.

FIGS. 2, 4, 5 and 6 show a first embodiment of the fluid container according to the invention in the form of the hydraulic tank 10 for the motor pump unit 5. The hydraulic tank 10 comprises a base part 12 which is formed more particularly by housing parts of the motor pump unit 5 and to which a tank body 14 is fastened, in this case screwed on. Of course, other configurations are also conceivable here.

Figure 2:
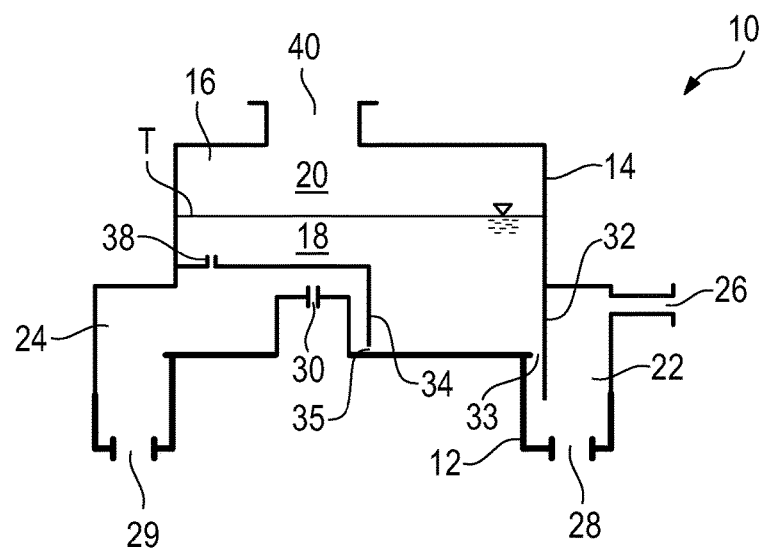
FIG. 2 shows a schematic representation of a fluid container in the form of a hydraulic tank according to a first embodiment of the invention.
Figure 5:
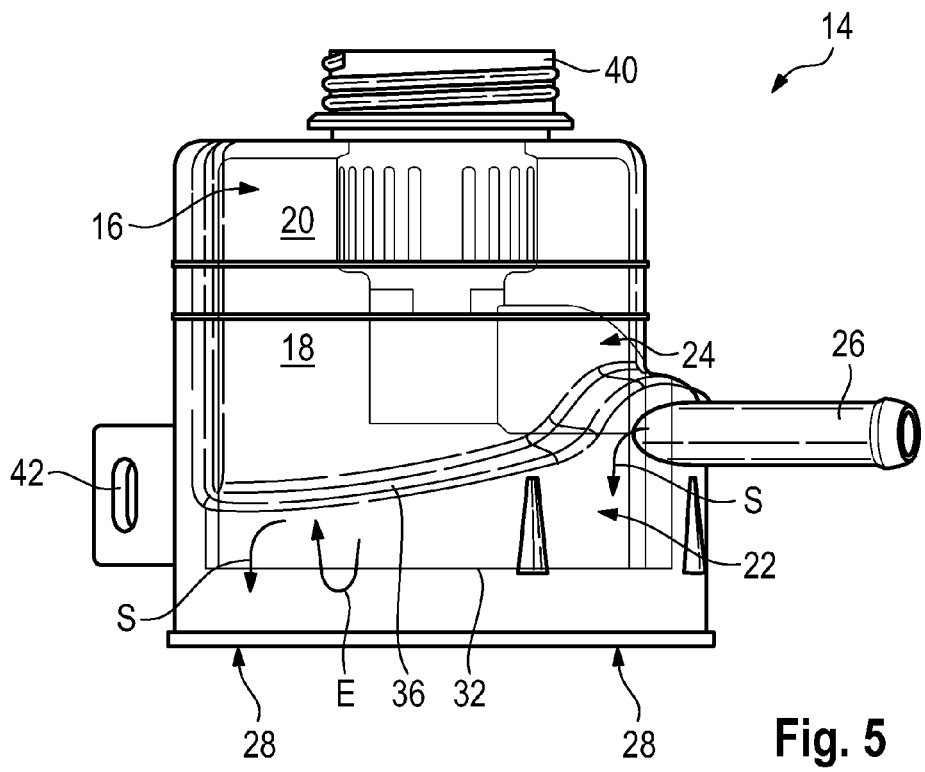
FIG. 5 shows a side view of a tank body of the hydraulic tank from FIG. 4 in a partly transparent representation.

An equalizing chamber 16 is provided in the interior of the hydraulic tank 10 and contains a supply of hydraulic fluid 18 and an equalizing volume filled with air 20 (see in particular FIGS. 2 and 5). The separating line between the air 20 and the hydraulic fluid 18 is denoted by T in the figures.

Figure 6:
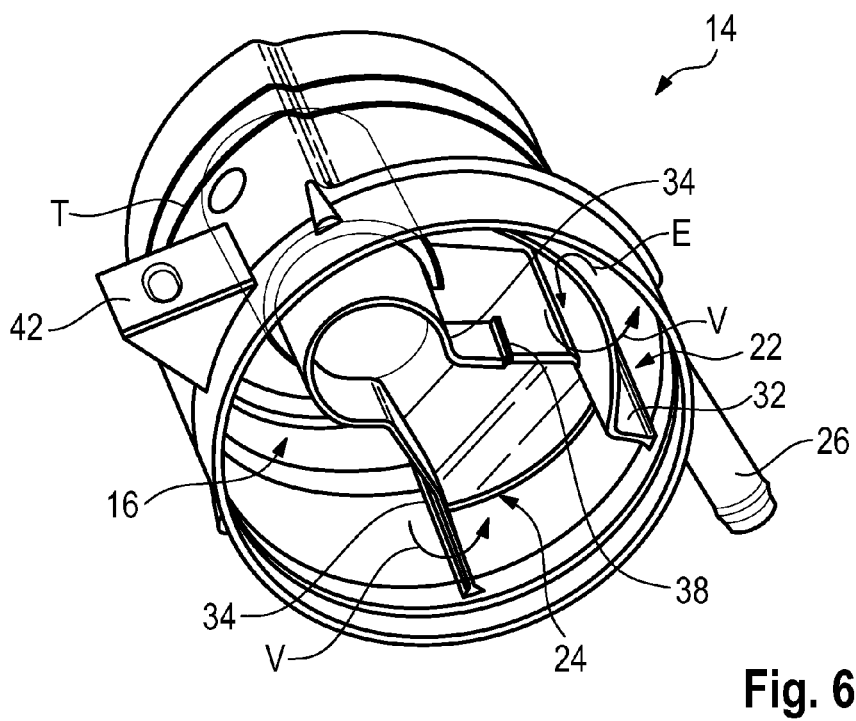
FIG. 6 shows a perspective view of the tank body from FIG. 5 as viewed from the bottom side, also in a partly transparent representation.

The hydraulic tank 10 further comprises a return chamber which is formed by a return flow chamber 22 and a valve flow chamber 24 that is spatially separate therefrom (FIGS. 2 and 6). A return port 26 of the hydraulic circuit 7 supplied by the motor pump unit 5 opens into the return flow chamber 22, and at least one, preferably a plurality of suction ports 28 for the pump 6 of the motor pump unit 5 is arranged in the lower area of the return flow chamber 22.

The valve flow chamber 24 also includes a suction port 29 for the pump 6 and furthermore an overpressure port 30 of the pressure relief valve 8 of the pump 6.

The suction ports 28, 29 and the overpressure port 30 are arranged in the base part 12 of the hydraulic tank 10, while the division of the hydraulic tank 10 into the equalizing chamber 16, the return flow chamber 22 and the valve flow chamber 24 is realized by chamber walls 32 and 34 formed or molded into the tank body 14. The chamber walls 32 and 34 project deeply into the hydraulic fluid 18 here, but do not quite extend as far as the bottom side of the tank body 14, which is why the return flow chamber 22 and the valve flow chamber 24 are in fluid communication with the equalizing chamber 16. The flow restrictors 33, 35 thus formed allow a volume equalization between the chambers 16 and 22 and, respectively, 24, indicated by the arrows V in FIG. 6. But since an exchange of fluid between the equalizing chamber 16 and the return flow chamber 22 and, respectively, the valve flow chamber 24 takes place only in a throttled manner and in the lower area of the hydraulic tank 10, remote from the air volume 20, any undesirable foam formation and mixing of hydraulic fluid 18 with air 20 will not occur here.

Figure 3:
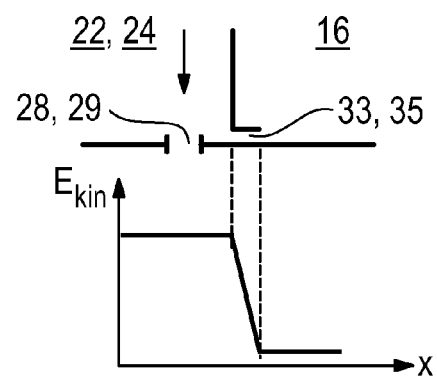
FIG. 3 shows a diagram which clearly illustrates the different kinetic energies of the fluid in the case of the fluid container according to the invention.
Figure 4:
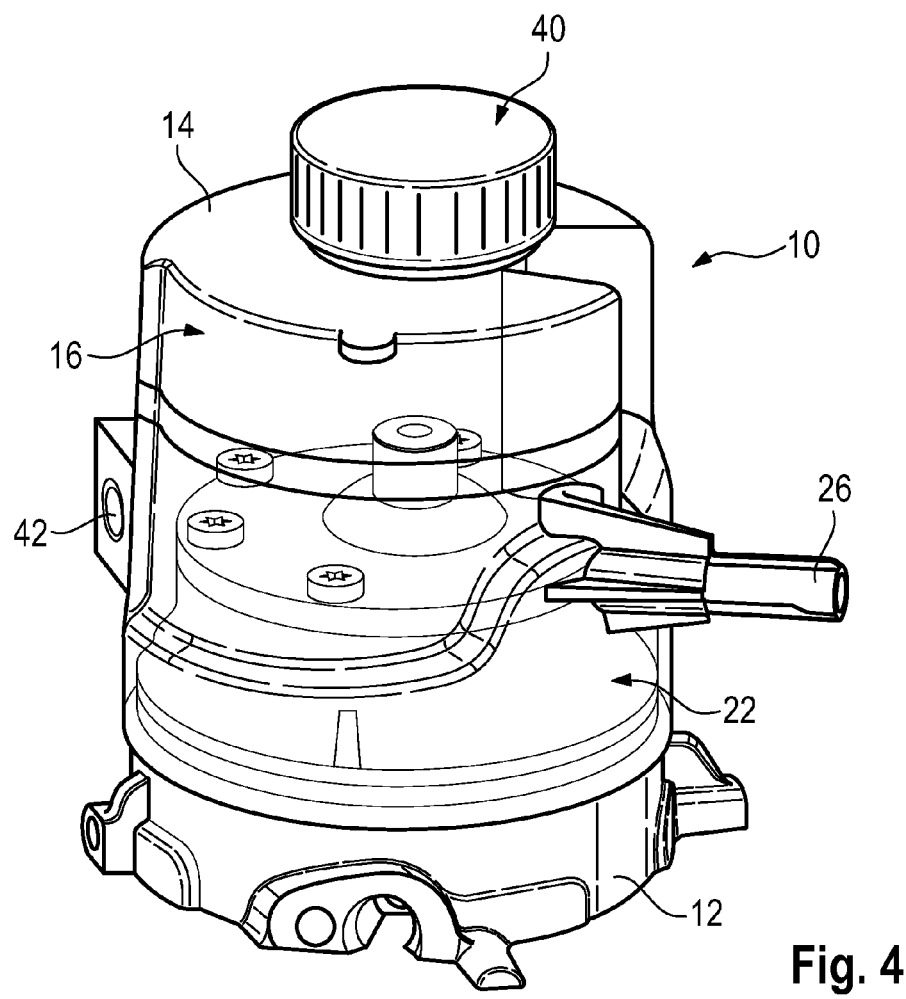
FIG. 4 shows a perspective view of a hydraulic tank according to FIG. 2 in a partly transparent representation.

In the fluid container according to the invention in the form of the hydraulic tank 10, fluid areas with a high kinetic energy (return flow chamber 22 and valve flow chamber 24) and fluid areas with a low kinetic energy (equalizing chamber 16) are separated from each other in accordance with a cascade principle. This is shown in FIG. 3, which illustrates the kinetic energy $E_{kin}$ of the fluid as a function of the position x.

It is only in the region of the flow restrictors 33, 35 that a minor fluid exchange takes place. The cascade principle allows any undesirable mixing of fluid and air and the foam formation resulting therefrom to be completely avoided, even in the case of very high performance densities.

The return flow chamber 22 includes a flow guiding element 36 which directs a partial flow E of the hydraulic fluid from the return flow chamber 22 into the equalizing chamber 16 and in this way provides for an automatic, permanent venting of the return flow chamber 22 (FIGS. 5 and 6). In addition, the flow guiding element 36 is configured such that it directs the major part of the return flow in the return flow chamber 22 towards the suction ports 28 for the pump (see arrows S in FIG. 5).

For venting purposes, the valve flow chamber 24 includes a vent opening 38 which is applied in the chamber wall 34 that separates the valve flow chamber 24 from the equalizing chamber 16. The vent opening 38 here extends over a partial height of the chamber wall 34 (FIG. 6), but it may also only be arranged at an elevated point, in particular the highest point of the chamber wall or may extend over the entire height of the chamber wall. It is, of course, conceivable to provide a flow guiding element in the valve flow chamber 24 as well, which directs the fluid flow towards the suction port 29 for the pump.

The hydraulic tank 10 further includes a filler neck 40 which is arranged roughly centrally at the top in the region of the equalizing chamber 16 and serves to fill the hydraulic tank 10, for example by way of the known process of vacuum filling.

In addition, the hydraulic tank 10 has one or more fastening elements 42 which are integrally formed or molded with the hydraulic tank 10, more precisely the tank body 14. Further means or features of the motor vehicle may be fastened thereto, which allows additional parts to be dispensed with. In case space is limited, the fastening elements may also be formed into the hydraulic tank 10.

Figure 7:
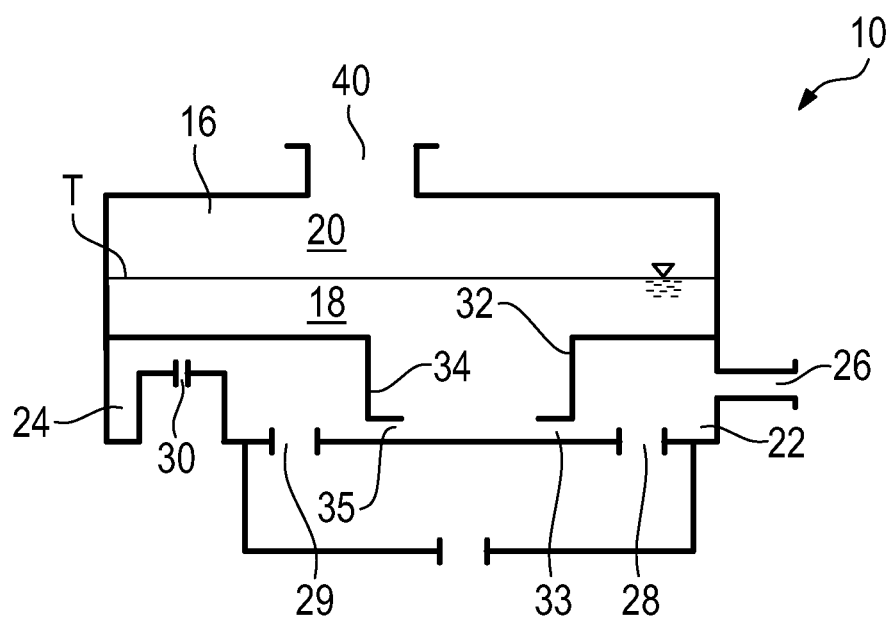
FIG. 7 shows a schematic representation of a fluid container in the form of a hydraulic tank according to a second embodiment of the invention.

FIG. 7 schematically shows an alternative configuration of the hydraulic tank 10 which differs from the tank shown in FIG. 2 mainly by the arrangement of the individual chambers. Besides, like components are provided with like reference numerals, and reference is made to the explanations above.

Finally, it is also pointed out that the invention is not limited to hydraulic tanks for motor pump units. All kinds of fluid containers in which a mixing between the fluid and gaseous phases may occur due to the flow therethrough are conceivable as a field of use here.

The invention claimed is:

1. A fluid container for a motor pump unit comprising:
an equalizing chamber that is adapted to contain a supply of fluid and air; and
at least one return chamber into which a return flow of the fluid can flow, wherein
fluid communication is provided between the return chamber and the equalizing chamber,
the return chamber is provided with a suction port for a pump of the motor pump unit,
the return chamber is subdivided into a return flow chamber, into which a return port of a hydraulic circuit supplied by the pump opens, and a valve flow chamber, into which an overpressure port of a pressure relief valve of the pump opens, and
the return flow chamber and the valve flow chamber are high fluid velocity areas that are each separated by a flow restrictor from a low fluid velocity area of the equalizing chamber,
wherein the suction port of the pump is arranged directly within the return chamber.

2. The fluid container according to claim 1 wherein the chambers are delimited from one another by chamber walls that have at least one flow restrictor provided therein that is arranged between the chambers.

3. The fluid container according to claim 1 wherein the chambers are delimited from one another by chamber walls that project into the fluid.

4. The fluid container according to claim 1 wherein at least one of the return flow chamber and the valve flow chamber has a vent opening.

5. The fluid container according to claim 4 wherein the return flow chamber includes a flow guiding element that directs a partial flow from the return flow chamber into the equalizing chamber.

6. The fluid container according to claim 1 wherein the return chamber includes at least one flow guiding element that directs the return flow toward the suction port for the pump.

7. A fluid container for a motor pump unit comprising:
an equalizing chamber that is adapted to contain a supply of fluid and air, and
at least one return chamber into which a return flow of the fluid can flow, wherein
fluid communication is provided between the return chamber and the equalizing chamber,
the return chamber is subdivided into a return flow chamber, into which a return port of a hydraulic circuit supplied by a pump of the motor pump unit opens, and a valve flow chamber, into which an overpressure port of a pressure relief valve of the pump of the motor pump unit opens, and
the return flow chamber and the valve flow chamber have separate suction ports for the pump of the motor pump unit arranged therein,
wherein the suction port of the pump is arranged directly within the return chamber.

8. The fluid container according to claim 7 wherein the chambers are delimited from one another by chamber walls that have at least one flow restrictor provided therein that is arranged between the chambers.

9. The fluid container according to claim 7 wherein the chambers are delimited from one another by chamber walls that project into the fluid.

10. The fluid container according to claim 7 wherein at least one of the return flow chamber and the valve flow chamber has a vent opening.

11. The fluid container according to claim 10 wherein the return flow chamber includes a flow guiding element that directs a partial flow from the return flow chamber into the equalizing chamber.

12. The fluid container according to claim 7 wherein the return chamber includes at least one flow guiding element that directs the return flow toward the suction port for the pump.

13. A fluid container for a motor pump unit comprising:
an equalizing chamber that is adapted to contain a supply of fluid and air, and
at least one return chamber into which a return flow of the fluid can flow, wherein
fluid communication is provided between the return chamber and the equalizing chamber,
the return chamber is provided with a suction port for a pump of the motor pump unit,
the return chamber is subdivided into a return flow chamber, into which a return port of a hydraulic circuit supplied by the pump opens, and a valve flow chamber, into which an overpressure port of a pressure relief valve of the pump opens, and
the valve flow chamber includes a vent opening that is applied in a chamber wall that separates the valve flow chamber from the equalizing chamber,
wherein the suction port of the pump is arranged directly within the return chamber.

14. The fluid container according to claim 13 wherein the chambers are delimited from one another by chamber walls that have at least one flow restrictor provided therein that is arranged between the chambers.

15. The fluid container according to claim 13 wherein the chambers are delimited from one another by chamber walls that project into the fluid.

16. The fluid container according to claim 13 wherein the return flow chamber has a vent opening.

17. The fluid container according to claim 16 wherein the return flow chamber includes a flow guiding element that directs a partial flow from the return flow chamber into the equalizing chamber.

18. The fluid container according to claim 13 wherein the vent opening is arranged at an elevated point of the chamber wall.

19. The fluid container according to claim 13 wherein the vent opening extends over a partial height or the entire height of the chamber wall.

20. The fluid container according to claim 13 wherein the return chamber includes at least one flow guiding element that directs the return flow toward the suction port for the pump.

* * * * *